United States Patent

Angersbach et al.

[11] 3,778,692
[45] Dec. 11, 1973

[54] ARRANGEMENT FOR SETTING THE SPEED OF AN ELECTRONIC MOTOR, PARTICULARLY THE MOTOR OF AN INDUSTRIAL SEWING MACHINE

[75] Inventors: Wolfgang Angersbach, Darmstadt; Karl-Heinz Meier, Zeilhard, Darmstadt, both of Germany

[73] Assignee: Quick-Rotan Becker & Notz KG, Darmstadt, Germany

[22] Filed: July 13, 1972

[21] Appl. No.: 271,531

[30] Foreign Application Priority Data
May 16, 1971 Germany.................. P 21 35 777.7

[52] U.S. Cl............................. 318/305, 324/34 PS
[51] Int. Cl............................................. G01r 33/06
[58] Field of Search............................. 318/35, 305; 322/DIG. 5, 51; 310/2, DIG. 3; 324/34 PS, 34 D, 45

[56] References Cited
UNITED STATES PATENTS
3,525,005  8/1970  Beyers................................ 322/51
3,018,395  1/1962  Carlstein............................. 310/40

Primary Examiner—Bernard A. Gilheany
Assistant Examiner—Thomas Langer
Attorney—Michael S. Striker

[57] ABSTRACT

A position-responsive electrical transducer comprises a magnetic member and a flux-responsive member adapted to produce an electrical signal indicative of magnetic flux strength. The members are mounted and spaced apart from each other in a first direction, and at least one of the members is movable relative to the other of the members in a second direction transverse to the first direction. A cam arrangement, or another arrangement which defines a path of motion, serves to effect relative movement between the members in said first direction as a predetermined function of relative movement between the members in said second direction. In this way, the distance between the members and thus the magnitude of the generated signal are varied as a predetermined function of relative movement between the members in said second direction.

22 Claims, 4 Drawing Figures

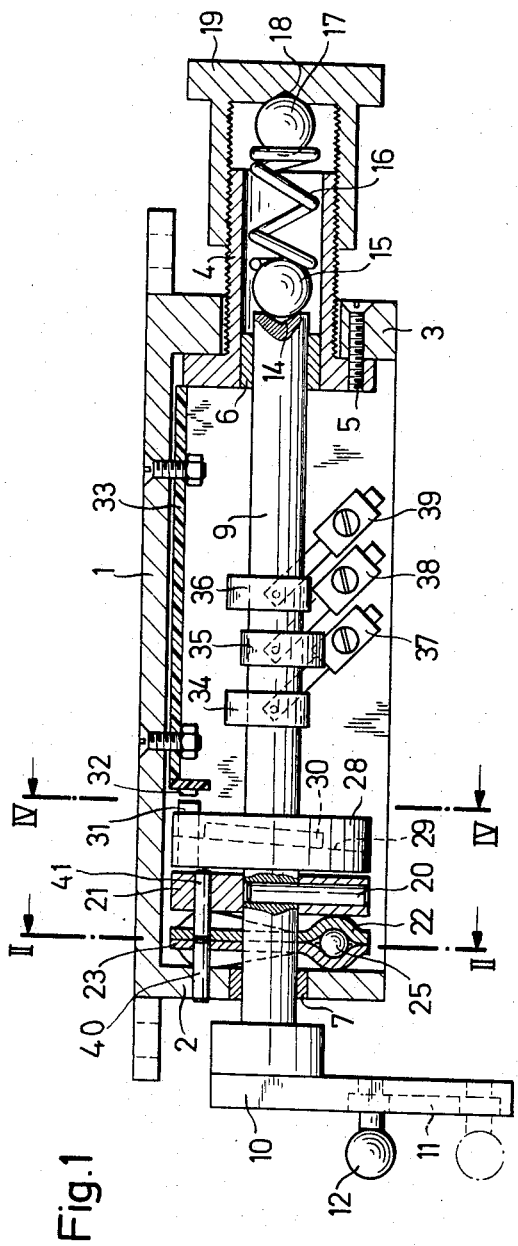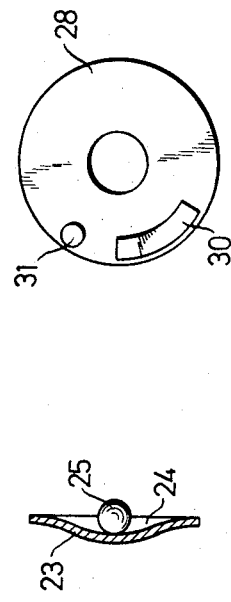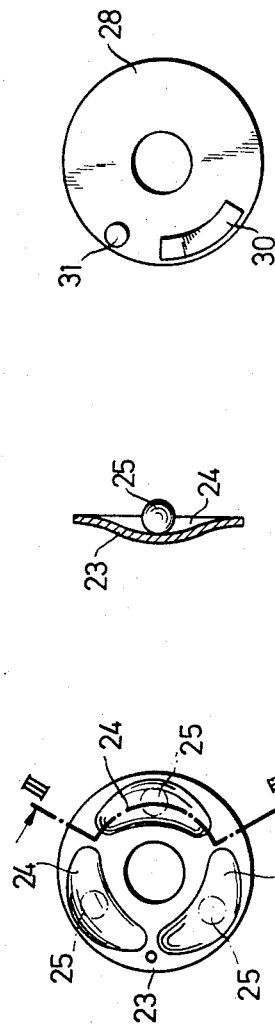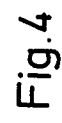

ARRANGEMENT FOR SETTING THE SPEED OF AN ELECTRONIC MOTOR, PARTICULARLY THE MOTOR OF AN INDUSTRIAL SEWING MACHINE

BACKGROUND OF THE INVENTION

The invention relates to electromechanical transducers, and more particularly to position-responsive electro-mechanical transducers. Such a device comprises a member movable to a plurality of positions, and is operative for generating an electrical signal having a predetermined relationship to the position of such member. The correspondence is usually linear, but may also be non-linear for the purposes of certain applications.

Still more particularly, the invention relates to arrangements for setting the speed of electric motors.

Such speed-setting arrangements usually include a potentiometer to which is applied a reference voltage. The sliding contact of the potentiometer is mechanically coupled to a moving member, for instance a manually settable control lever, and the movement of such member varies the voltage at such sliding contact. An arrangement of this type is disclosed for instance in U.S. Pat. No. 3,160,128. In actual use, such potentiometers are very much subject to wear. For example, if such a potentiometer is used in the control pedal of an industrial sewing machine, it is to be expected that the sliding potentiometer contact will move through substantially its entire operational range many thousands of times per day, inasmuch as such a sewing machine will sew as many as 2,000 or more seams daily. The consequence of such constant use is that certain of the moving parts of the potentiometer, particularly for example the sliding contact itself, wear away quite soon to an extent requiring replacement of parts, or replacement of the entire potentiometer. This is of course very disadvantageous. When such replacement is not undertaken, the potentiometer may operate in a faulty manner, or not at all.

To overcome such disadvantages, it has already been proposed (for instance in Italian Pat. No. 864,305) to make use of a transformer-type transducer. That transducer included a primary A.C.-excited winding and a secondary winding whose voltage served as the control voltage. The windings were wound around respective ones of a pair of aligned magnetic cores, and the spacing between the cores was varied so as to vary the coupling between the windings. This construction avoided the problem of wear associated with potentiometer-type input transducers. However, the cost involved in constructing transformer-type transducers which are accurately effective for their intended purpose is substantial.

Another arrangement of this general type is disclosed in Technical Journal of 1962, pp. 523-524 of the Siemens Corporation of Germany. That arrangement includes a group of permanently magnetized members arranged in a straight row or along an arc of a circle. The magnetic polarity of these members alternates from one member of the row to the next. The row of magnetic members is moved past a Hall generator and, upon each change of polarity of the flux sensed by the Hall generator, a voltage is produced which has a value corresponding to one or the other of two switching values. In other words, this arrangement makes use of the discontinuous variation in magnetic flux strength, and more specifically makes use of sudden reversals of flux polarity. The Hall generator is driven into saturation during at least a part of its operation. Such an arrangement is not suitable for use in a speed-setting unit which sets the speed of an electric motor, because such unit should be capable of furnishing a control signal whose value can vary more or less continuously within an operational range of values. It is possible to design such a controller wherein the leading and trailing edges of the Hall-generator voltage, associated with the transition from one switching level to another, are somewhat less steep than with the arrangement just referred to. This can be achieved by mounting the magnetic members on a rotatable non-magnetic disk and arranging them not along an arc of a circle, but on a cord of a circle, for at least part of the angular extent of the arrangement. However, such expedient still does not meet the requirements for a unit which sets the speed of an electric motor, because the plurality of magnetic members required and the high precision necessary in mounting them on the carrier disk results in too great a final cost of the arrangement. Also, an attempt to derive the control signal from only the leading or trailing edge of the varying Hall voltage can result in signal discontinuities as the discrete magnetic members are moved past the Hall generator.

SUMMARY OF THE INVENTION

It is the general object of the invention to overcome the disadvantages of the prior art.

It is a related object of the invention to provide a novel transducer construction which overcomes the disadvantages of the prior art.

It is a concomitant object to provide a novel transducer construction which is uniquely and advantageously adapted for use in units which set the speed of electric motors.

It is a further object to provide a novel arrangement of the type in question which is characterized by extreme simplicity.

It is a related object to provide an arrangement which is subject to the deleterious effects of mechanical wear only to an extremely limited extent.

It is another object to provide an arrangement which is sturdy and which is inexpensive to manufacture.

It is yet another object to provide an arrangement which permits the synthesis of non-linear functional relationships between the position of a mechanical member and the magnitude of a generated control signal, and by mechanical means, without resort to complicated electrical networks adapted to synthesize such functional relationships.

These objects, and others which will become more understandable below, can be met by a construction which includes a magnetic member and a flux-responsive member adapted to produce an electrical signal whose magnitude is indicative of magnetic flux strength. A mounting arrangement mounts the members spaced apart from each other in a first direction, and includes moving means for moving at least one of the members relative to the other of the members in a second direction transverse to the first direction. An additional means effects relative movement between the magnetic member and the flux-responsive member in the first direction as a predetermined function of relative movement between the members in the second direction; in this way, the distance between the members and thus the magnitude of the generated electrical signal are varied as a predetermined function of relative movement between the members in the second direction.

In the illustrated embodiment, the magnetic member is mounted on a rotatable shaft connected to a lever. A Hall generator is mounted on the housing of the arrangement. The shaft can be rotated to cause relative rotational movement between the Hall generator and the magnet. Such relative movement results in axial movement of the magnet towards and away from the Hall generator member, in a sense varying the Hall voltage. The magnetic member can be of arcuate configuration and can extend circumferentially of the rotatable shaft and have a constant thickness in direction parallel to the shaft. By moving the magnet towards and away from the Hall generator in a controlled manner, and as a predetermined function of relative rotational movement, many different types of functional relationships can be established between the magnitude of the Hall voltage and the relative rotational displacement between the magnetic member and the Hall generator. For instance, it is possible to synthesize linear, quadratic, exponential, or even entirely empirical relationships between such position and the Hall voltage. Such versatility of function synthesis can be particularly important, for instance, for the setting of speeds of an electric motor, it being well known that the relationship between speed and activating voltage in many motors is not always quite linear, and sometimes in fact quite non-linear.

In order to avoid the necessity of furnishing current to a moving component, it is convenient, although not absolutely necessary, to mount the Hall-generator on the stationary housing of the arrangement. The magnetic member, advantageously a permanent magnet, can then be the movable member. Advantageously, the magnetic member can be mounted on a carrier having an inclined surface or a camming surface so configurated that rotation of the magnetic member about the aforementioned shaft results in axial movement of the magnetic member towards or away from the Hall generator.

However, the movement of the magnetic member in axial direction towards and away from the Hall generator can be effected, in addition or alternatively, by axially shifting the entire mounting shaft as a predetermined function of mounting shaft rotation. It is furthermore advantageous to provide a return spring arrangement which normally biases the mounting shaft to a predetermined null position. Moreover, it is advantageous to provide for adjustability of the biasing force of such return spring arrangement, to permit greater adaptability of the arrangement to different applications.

It is also advantageous to permit rotation of the mounting shaft from its null position in both rotational directions thereof, and to so design the arrangement that the shaft will be caused to advance axially in a predetermined manner, regardless of the direction of rotationn of the shaft from its null position. When the arrangement is so designed it is possible, for instance, to rotate the shaft from its null position in one direction, in correspondence to running of the controlled motor in first direction, and to rotate the shaft from its null position in opposite direction to control the running of the motor in reverse direction. Alternatively, one direction of rotation from null position might correspond to control of motor speed, whereas the other direction of rotation from null position might effect control of an auxiliary function; for instance in an industrial sewing machine, the second type of rotation might control movement of the sewing needle to one of its extreme positions.

A particularly advantageous construction results when the aforementioned return spring means comprises a helical compression spring whose axis is aligned with that of the aforementioned mounting shaft. A spherical member can be partially accomodated in a recess in the end face of the mounting shaft and partially accommodated in an end convolution of the helical compression spring advantageously the other end of the helical compression spring fits about a further spherical member which abuts against an abutment surface spaced from the just mentioned shaft end face. To permit adjustment of the biasing force of the compression spring, it is advantageous to make the distance in axial direction between the shaft end and the abutment surface adjustable.

Advantageously, the Hall generator member is mounted on a circuit board upon which is also mounted circuitry associated with the Hall generator. Such circuitry may comprise simple amplifier stages, for instance, or may comprise networks which synthesize transfer functions, for instance in addition to the synthesis of functional relationships resulting from the controlled movement of the magnetic member towards and away from the Hall generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a longitudinal section through an exemplary arrangement according to the invention;

FIG. 2 is a section, taken on line II—II of FIG. 1, and illustrating one component of the arrangement of FIG. 1;

FIG. 3 is a sectional view through the component shown in FIG. 2, and taken on line III—III of FIG. 2; and FIG. 4 is a sectional view of part of FIG. 1, and taken on section line IV—IV of FIG. 1.

DESCRIPTION OF THE PREFERRED EMBODIMENTS

The illustrated arrangement has a housing 1 with side walls 2 and 3. Side wall 3 is provided with a threaded bore which accommodates an externally threaded member 4. Member 4 is fixedly secured to side wall 3 by three screws displaced from one another at angles of 120° relative to the axis of member 4; only one such screw 5 is shown. Member 4 accommodates within its longitudinal hollow interior a friction bearing 6, and a second friction bearing 7 is mounted on side wall 2 of housing 1.

Friction bearings 6 and 7 mount a shaft 9 for rotation. Fixedly connected to one end of shaft 9 (the left end in FIG. 1) is a lever 10, constituting part of moving means in this embodiment. Lever 10 has a longitudinally extending slot 11 in which is slidably guided a connecting member 12 having a portion of generally spherical configuration. Connecting member 12 is arrestable in any desired position along the length of slot 11. The radially innermost position of connecting member 12 is shown in FIG. 1, and the radially outermost position is indicated in phantom-lines. Connecting member 12 can serve to connect the lever 10 with a control element used to control the speed of a motor; for instance connecting member 12 can connect lever 10 to the pedal of an industrial sewing machine.

The end face of shaft 9 remote from lever 10 has a recess 14 which accommodates a ball member 14. An end convolution of a helical compression spring 16 is fitted on ball member 15, the compression spring 16 being coaxial with shaft 9. The opposite end convolution of spring 16 bears on an additional ball member 17 which is supported in a recess 18 in the abutment surface of abutment 19. Components 14-19 constitute return spring means in this embodiment. Abutment 19 is threaded onto threaded member 4. Abutment 19 can be turned relative to member 4 in a sense varying the biasing force exerted by spring 16 upon the end 14 of shaft 9; abutment 19 and member 4 accordingly constitute adjusting means in this embodiment.

A disk 21 is fixedly mounted on rotatable shaft 9 via a mounting pin 20. A cam plate 22 is fixedly connected to disk 21 via connecting pin 41. A second, complementary cam plate 23 is mounted on side wall 2 of housing 1 via mounting pin 40. Thus, cam plate 22 is rotatable with shaft 9, whereas cam plate 23 is stationary.

The configuration of cam plates 22 and 23 is illustrated in FIGS. 2 and 3. Cam plate 23 has three guide channels 24 of generally kidney-shaped configuration. The spherical members 25 illustrated in phantom lines in FIG. 2 are located at the deepest portion of the respective channels 24, and the depth of the channels 24 decreases to zero in direction away from such deepest portions and circumferentially of the axis of rotation of the disk 23. The varying depth of the guide channels 24 is indicated in FIG. 3.

Also fixedly mounted on rotatable shaft 9 is a carrier member 28 of plastic or another non-magnetic material. Carrier member 28 is of disk-like configuration, as seen in FIG. 4, and carries magnetic member 30, which is seen in FIG. 4 to be of arcuate configuration and to extend in direction circumferentially of the shaft 9.

Magnetic member 30 is of uniform thickness, as measured in direction axially of the shaft 9. This type of magnetic member is readily available commercially; however, it may be desirable to employ a magnetic member of more intricate configuration for certain purposes.

It will be noted that the surface 29 of carrier member 28 upon which the magnetic member 30 is actually mounted is inclined relative to the axis of shaft 9. Also, the carrier member 28 carries a further magnetic member 31 of generally rod-shaped configuration.

Magnetic members 30 and 31 are polarized in direction axially of shaft 9, and are spaced from Hall generator member 32 in first direction, i.e., in direction parallel to shaft 9. Whereas magnetic members 30 and 31 are spaced from Hall generator member 32, they are at the same time in operative proximity to member 32, so that the flux associated with members 30 and 31 can be sensed. In this embodiment, members 1-3, 6, 7, 9, 28 and 33 form mounting means, and Hall generator 32 is mounted on a circuit board 33, which in turn is mounted on stationary portion 1 of the mounting means.

For the sake of compactness, circuit board 33 carries the actual (non-illustrated)circuitry employed to convert the Hall voltage into an appropriate activating signal for an electric motor to be controlled. Very advantageously, the circuitry on circuit board 33 is in the form of printed circuits.

Also fixedly mounted on rotatable shaft 9 are cam wheels 34, 35 and 36, which cooperate with electrical contacts 37, 38 and 39.

Return spring means 14-19 biases shaft 9 in a single axial direction (leftwards in FIG. 1). Because of the mutual dependence between the axial displacement of shaft 9 and its rotational orientation, return spring means 14-19 likewise tends to bias shaft 9 in a rotational sense. When no force is exerted on lever 10, return spring means 14-19, will bias shaft 9 axially leftwards (in FIG. 1) until the planar surfaces of cam plates 22 and 23 are in contact. For the planar surfaces of cam plates 22, 23 to be in contact, cam plate 22 must turn relative to cam plate 23 until the kidney-shaped guide channels 24 of the two cam plates are in registry. When such registry is achieved, the channels will together define a chamber large enough to accommodate spherical members 25 without axial separation of the cam plates 22, 23. This is the null position of the arrangement. Shaft 9 may be rotated out of its null position in either rotational direction, but regardless of the direction of such rotation, departure from the null position results in axial shifting of shaft 9 in rightwards direction ( as seen in FIG. 1.).

As shaft 9 is turned away from its null position, the spacing between arcuate magnet 30 and Hall generator 32 varies. In this embodiment, such spacing varies, in addition, because of inclined orientation of surface portion 29 of carrier member 28. It is possible with such an arrangement to synthesize a great variety of functional relationships between the rotational displacement of shaft 9 and the variation in Hall voltage. The desired functional relationship can be synthesized by suitable design of cam plates 22, 23 or another cam arrangement, and/or the inclination of surface portion 29, and/or the configuration of magnetic member 30, and/or the sensitivity of the Hall generator, and/or the null-position spacing between members 30 and 32. Advantageously, these design variables are so mutually adjusted that over the entire operative range of relative movement between members 30 and 32, no saturation of member 32 will occur. In the exemplary embodiment, the range of rotational movement of shaft 9 is limited by (non-illustrated) stops, to prevent relative rotational displacement between cam plates 22, 23 to such an extent as might result in dropping out of spherical members 25 from between the cam plates.

In the illustrated embodiment, turning of shaft 9 in one rotational direction thereof, brings arcuate magnet 30 into cooperation with Hall generator 32; and turning of shaft 9 in the other rotational direction thereof brings rod-shaped magnet 31 into cooperation with Hall generator 32. Movement past Hall generator 32 of rod-shaped magnet 31 creates a Hall voltage pulse which may be used to control an auxiliary function. For instance, in an industrial sewing machine, cooperation between members 30 and 32 corresponds to control of the sewing speed, whereas cooperation between members 31 and 32 corresponds to lifting of the sewing needle to its uppermost position, to permit removal of the goods being sewn.

The illustrated arrangement is characterized by advantageous adjustability. As already mentioned, connecting member 12 is slidable along the length of slot 11 in lever 10 and can be arrested in any desired position along the slot. Likewise, turning of threaded member 19 varies the pre-compression of spring 16, and thereby varies the biasing force tending to return shaft 9 to its null position. The cam wheels 34–36 and electrical contacts 37–39 cooperate to produce electrical signals when shaft 9 assumes predetermined rotational orientations. Such signals can be used to effect further auxiliary functions; for instance, if rotation of shaft 9 in one direction thereof effects needle lifting, as mentioned before, then further shaft rotation in such direction might result in cutting of the sewing threads.

The control of variable-speed motors involves taking into consideration a great variety of types of operating curves. The required functional relationships between the position of lever 10 and the magnitude of the generated activating signal can very advantageously be realized by suitable configuration of carrier member 28. In that way, it becomes possible to replace carrier member 28 with another such member of different configuration, when the speed of a motor having different characteristics is to be controlled. The configuration of surface 29 of carrier member 28 need not be a simple inclined plane, but could have a more complicated shape, if necessary. The axial movement of magnet 30 could be effected solely as a result of the configuration of carrier member 28, or in addition to the axial movement effected by provision of cam means 22–25. Moreover, the axial movements associated with carrier 28 and cam means 22–25 can be either additive or subtractive.

The provision of contacts 37 to 39 makes possible the control of a great variety of auxiliary functions, in addition to the aforementioned speed control, and all with a single setting arrangement. Except for such electrical contacts, the arrangement operates virtually without wear, and is simple to assemble and inexpensive to manufacture. To further increase the versatility of the arrangement, it is possible, to mount still further magnetic members on carrier member 28, and these could cooperate with the same Hall generator, or with a plurality of different Hall generators. Likewise, several carrier members 28 can be provided, each having one or more magnetic members cooperating with a plurality of respective Hall generators.

It will be understood that each of the elements described above, or two or more together, may also find a useful application in other types of constructions differing from the types described above.

While the invention has been illustrated and described as embodied in an arrangement for setting the speed of an electric motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

In the appended claims, components 1, 2, 6, 7, 9, 28 and 33 are referred to as mounting means, whereas components 3–5, 14–25, 28, 29, 40 and 41 are referred to as so-called additional means.

What is claimed as new and desired to be protected by Letters Patent is set forth in the appended claims:

1. An electrical position transducer, comprising, in combination magnet means; flux-responsive means operative when the distance and orientation of said flux-responsive means relative to said magnet means are fixed for generating an electrical signal dependent upon such distance and relative orientation; mounting means mounting said magnet means and said flux-responsive means spaced apart from each other in a first direction and including moving means for changing the relative orientation between said magnet means and said flux-responsive means in a second direction transverse to said first direction; and additional means for effecting relative movement between said magnet means and said flux-responsive means in said first direction as a predetermined function of the relative orientation between said magnet means and said flux-responsive means in said second direction so as to vary the distance between said magnet means and said flux-responsive means in said first direction as a predetermined function of the relative orientation between said magnet means and said flux-responsive means in said second direction, to establish a different value for said signal for each of a plurality of different fixed relative orientations of said magnet means relative to said flux-responsive means in said second direction.

2. A device as defined in claim 1, wherein one of said magnet means and flux-responsive means is rotatable relative to the other of said magnet means and said flux-responsive means, and wherein said second direction is the direction of relative rotation.

3. A device as defined in claim 2, wherein said first direction is parallel to the axis of rotation of said one of said means.

4. A device as defined in claim 3, wherein said magnet means comprises a magnetic member of generally arcuate configuration.

5. A device as defined in claim 5, wherein said magnet means comprises a magnetic member of constant thickness in direction parallel to said axis.

6. A device as defined in claim 1, wherein said mounting means comprises a rotatable shaft and a carrier member fixedly mounted on said shaft and carrying said magnet means, and wherein said mounting means further comprises a stationary portion, and wherein said flux-responsive means is mounted on said stationary portion and spaced in axial direction from said magnet means, and wherein said second direction is the direction of rotation of said shaft.

7. A device as defined in claim 6, wherein said carrier member comprises a surface portion inclined relative to said axis, and wherein said magnet means is mounted on said surface portion, is of generally arcuate configuration, and extends in direction circumferentially of said axis.

8. A device as defined in claim 6, wherein said moving means defines a lever fixedly connected to and extending radially of said shaft and a connecting member mounted on said lever and positionable at any of a plurality of positions along the length of said lever.

9. A device as defined in claim 8, wherein said connecting member includes a portion of generally spherical configuration, and wherein said lever is provided with a longitudinally extending slot, and wherein said connecting member is slidable within and along the length of said slot.

10. A position-responsive electrical transducer, comprising in combination flux-responsive means adapted to produce an electrical signal whose magnitude is indicative of magnetic flux strength; magnet means; mounting means including a rotatable shaft and a stationary portion, said flux-responsive means being mounted on said stationary portion and said magnet means being mounted for rotation with said shaft relative to said flux-responsive means and axially spaced from the latter; and additional means comprising cam means of predetermined configuration operative for moving said shaft in axial direction as a predetermined function of shaft rotation, whereby to vary the axial distance between said magnet means and said flux-responsive means and thus the magnitude of said signal as a predetermined function of the rotation of said magnet means relative to said flux-responsive means.

11. A device as defined in claim 10, wherein said additional means further comprises return spring means for biasing said shaft to a predetermined angular orientation and axial position constituting a null position.

12. A device as defined in claim 11, wherein said additional means further includes adjusting means for adjusting the biasing force of said return spring means.

13. A device as defined in claim 11, wherein said cam means is so configurated that rotation out of said null position in either rotational direction results in axial movement of the shaft in a single direction.

14. A device as defined in claim 11, wherein said return spring means comprises a helical compression spring having an axis aligned with the axis of said shaft, and a ball member fitted into an end convolution of said helical compression spring and mounted on an axial end face of said shaft.

15. A device as defined in claim 14, wherein said return spring means further includes an abutment spaced from said free axial end face of said shaft in axial direction, and wherein said helical compression spring is confined between said free axial end face and said abutment, and wherein said return spring means further includes an additional ball member fitting into the opposite end convolution of said compression spring and supported on said abutment.

16. A device as defined in claim 11, wherein said cam means comprises a pair of axially spaced complementary cam plates one of which is mounted on said stationary portion of said mounting means and the other of which is fixedly mounted on said shaft, and at least one spherical member confined between said plates, and wherein said plates define guide channels for said spherical member, and wherein the depth of said channels varies in direction circumferentially of said shaft, and has a maximum corresponding to said null position.

17. A device as defined in claim 10, wherein said cam means comprises a pair of axially spaced complementary cam plates one of which is mounted on said stationary portion of said mounting means and the other of which is fixedly mounted on said shaft, and at least one spherical member confined between said plates, and wherein said plates define guide channels for said spherical member, and wherein the depth of said channels varies in direction circumferentially of said shaft.

18. A device as defined in claim 1, wherein said flux-responsive means comprises a Hall generator and wherein said additional means is operative for maintaining said magnet means and said flux-responsive means sufficiently far apart to prevent saturation of said Hall generator.

19. A device as defined in claim 18, wherein said Hall generator is mounted on a circuit board which carries circuitry cooperating with said Hall generator.

20. A device as defined in claim 19, wherein said circuit board carries a printed circuit.

21. A positionresponsive electrical transducer, comprising in combination flux-responsive means adapted to produce an electrical signal whose magnitude is indicative of magnetic flux strength; magnet means; mounting means mounting said magnet means and flux-responsive means for relative rotation with respect to a predetermined axis spaced apart from each other in axial first direction and including moving means for rotating at least one of said magnet means and flux-responsive means relative to the other of said magnet means and flux-responsive means in circumferential second direction; and additional means comprising cam means of predetermined configuration for moving one of said magnet means and flux-responsive means relative to the other of said magnet means and flux-responsive means in axial direction as a predetermined function of relative rotation between said magnet means and flux-responsive means.

22. A position-responsive electrical transducer, comprising in combination flux-responsive means adapted to produce an electrical signal whose magnitude is indicative of flux strength; magnet means; mounting means including a rotatable shaft and a stationary portion, said flux-responsive means being mounted on said stationary portion and said magnet means being mounted for rotation with said shaft relative to said flux-responsive means axially spaced from the latter; additional means for moving said magnet means in axial direction with respect to said flux-responsive means as a predetermined function of rotational movement of said magnet means with respect to said flux-responsive means, whereby to vary the axial distance between said magnet means and flux-responsive means and thus the magnitude of said signal as a predetermined function of the rotational movement of said magnet means relative to said flux-responsive means; and further including at least one electrical contact mounted on said stationary portion of said mounting means and at least one cam wheel mounted on said shaft for activating said electrical contact when said shaft rotates to a predetermined rotational position thereof.

* * * * *